United States Patent
Emoto

(10) Patent No.: US 8,145,330 B2
(45) Date of Patent: Mar. 27, 2012

(54) PLANT GROWING SYSTEM USING PORTABLE TELEPHONE

(75) Inventor: Kenji Emoto, Kyoto (JP)

(73) Assignee: Fairy Plant Technology Inc., Kyoto (JP)

( * ) Notice: Subject to any disclaimer, the term of this patent is extended or adjusted under 35 U.S.C. 154(b) by 344 days.

(21) Appl. No.: 12/161,852

(22) PCT Filed: Feb. 7, 2007

(86) PCT No.: PCT/JP2007/052091
§ 371 (c)(1),
(2), (4) Date: Jul. 23, 2008

(87) PCT Pub. No.: WO2007/091586
PCT Pub. Date: Aug. 16, 2007

(65) Prior Publication Data
US 2009/0031622 A1    Feb. 5, 2009

(30) Foreign Application Priority Data
Feb. 7, 2006  (JP) ............................... P2006-030095

(51) Int. Cl.
*G05B 19/18* (2006.01)
(52) U.S. Cl. ............ 700/65; 700/17; 700/275; 700/284; 47/17
(58) Field of Classification Search ............ 700/17, 700/65, 275, 284; 47/17
See application file for complete search history.

(56) References Cited

U.S. PATENT DOCUMENTS

| 6,997,642 | B2 * | 2/2006 | Bishop, Jr. ............... 405/37 |
| 7,010,396 | B2 * | 3/2006 | Ware et al. ............... 700/284 |
| 2002/0088173 | A1 * | 7/2002 | Hessel et al. ............ 47/60 |
| 2005/0004715 | A1 * | 1/2005 | Christiansen ............ 700/284 |
| 2005/0072935 | A1 * | 4/2005 | Lussier ................... 250/458.1 |
| 2006/0196116 | A1 * | 9/2006 | Zettl ...................... 47/58.1 R |
| 2007/0203972 | A1 * | 8/2007 | Wewalaarachchi et al. .. 709/202 |
| 2007/0289207 | A1 * | 12/2007 | May et al. ............... 47/17 |

FOREIGN PATENT DOCUMENTS

| JP | 2001-265854 | 9/2001 |
| JP | 2005-080592 | 3/2005 |

* cited by examiner

*Primary Examiner* — Kakali Chaki
*Assistant Examiner* — Nathan Laughlin

(57) ABSTRACT

A plant growing environment control terminal (P) comprises an image data receiving section (1*a*) for receiving image data on the image of a plant from a plant growing facility (Q), an image display section (1*b*) for displaying the plant image according to the received image data, a growing environment data receiving section (1*c*) for receiving growing environment data, and a growing environment data transmitting section (1*f*) for transmitting the received growing environment data to the plant growing facility (Q). The end user can grow the plant in his (her) own way while checking the growth progress on the image even from a remote place. Therefore, a plant growing environment control terminal (P) effectively producing generally called healing effect is provided.

20 Claims, 10 Drawing Sheets

PLANT GROWING SYSTEM USING PORTABLE TELEPHONE

BACKGROUND OF THE INVENTION

1. Field of the Invention

The present invention relates to a plant growing environment control terminal, a plant growing facility and the like configured to be able to control a growing embodiment of a plant at a remote place using an image of the plant being grown.

2. Description of the Background Art

There is conventionally known a system configured to be able to remotely control a temperature, a humidity, a sunshine duration and the like of a hydroponic greenhouse from a central command control room through the Internet.

Specifically and for example, a system of this type is configured as follows. A greenhouse and a vegetable or fruit growing device are held by each of a plurality of distributed producers managed by the central command control room. The central command control room supplies seedlings of a predetermined vegetable or fruit and mineral resources for cultivation production quantitatively, and transmits a growing method command to each of the distributed producers through the Internet. The grown vegetables or fruits are transported to each of end consumers who applied for purchase to the central command control room through the Internet according to a command from the central command control room via a home delivery system. Each of the end consumers pays a relevant fee to the central command control room via the home delivery system or at a convenience store.

By so configuring the system, it is possible to organize not only large-scale vegetable or fruit farmers but also small-scale farmers with side jobs or aged persons each cultivating a kitchen garden as distributed producers by instructing them how to grow vegetables or fruits. It is, therefore, possible to promptly supply fresh vegetables at low cost as disclosed in, for example, Japanese Patent Application Laid-Open No. 2001-265854

SUMMARY OF THE INVENTION

However, a conventional system configured as stated above can by no means satisfy each end consumer's requirement to enjoy harvesting plants grown by his or her own way such as an original kitchen garden.

The present invention has been made in view of the above-stated conventional disadvantages. It is a main object of the present invention to provide a plant growing environment control terminal that enables each user to grow a plant by his or her own way while checking a growing process by images even at a remote place and that can effectively produce a so-called healing effect.

According to an aspect of the present invention, there is provided a plant growing environment control terminal including: an image receiving section receiving image data from a plant growing facility, the plant growing facility configured to control a growing environment of a plant based on growing environment data for setting or changing the growing environment, and configure to pick up an image of the plant being grown in the growing environment, the growing environment including an irradiation light, a temperature, and a humidity; an image display section displaying the image of the plant based on the image data received by the image data receiving section; a growing environment data receiving section receiving the growing environment data; and a growing environment data transmitting section transmitting the growing environment data received by the growing environment data receiving section to the plant growing facility.

The "plant" used herein is a wide concept including not only plants that can be used as foods such as vegetables and fruits but also ornamental plants. Furthermore, the growing method is preferably, but not limited to, a hydroponic culture and may be a soil culture. Moreover, the "image of the plant" may be either a still image or a moving image.

If the plant growing environment control terminal configured as stated above is used, an end consumer (which is a wide concept including not only those eating and consuming plants but also those only appreciating plants) can set growing environment data reflecting his or her own way and to grow his or her plant in the plant growing facility at user's desired time from a remote place from the plant growing facility. Further, it is possible to save time and labor for going to the plant growing facility to tend the plant.

Furthermore, as stated, the end consumer can grow his or her plant by his or her own way without the need to bother to visit the place where the farm is present by the train, the car or the like. It is, therefore, possible to, for example, provide a new lifestyle to an end consumer living in the city. For example, the present invention can realize a new and different way to enjoy himself or herself and a new and different hobby such as everyone's bringing something to eat or appreciate to hold a tasting party, an appreciation event or the like by bringing the grown plant to the user's home. At that time, the end consumer can realize a dream or a desire of growing the plant as desired, thus producing a so-called healing effect of promoting the stress incidental to modern people to be gotten rid of.

Moreover, particularly since the end consumer can specifically grasp a process of growing using images, it is possible to produce an effective educational effect to children or the like. Namely, even if the user fails to grow the plant quite well, it is possible to confirm the failure as images. Alternatively, it is possible to enhance a learning effect as to how the plant tastes good or how the growth of the plant fails by bringing the plant home and eating it.

To make it possible to easily set the growing environment data at desired time wherever the user is, the plant growing environment control terminal is preferably a portable telephone including at least the data transmission and reception functions and the image display function.

It is preferable, for example, that the plant growing environment control terminal according to the aspect of the present invention is configured to further include a growing environment data reception supporting section selectably displaying receiving parameters for promoting the growing environment data receiving section to receive the growing environment data.

Examples of the receiving parameters selectably displayed include beginner receiving parameters for guaranteeing taste to some extent by fixing predetermined growing environment data among a plurality of pieces of growing environment data, and senior receiving parameters for possibly making taste extremely attractive or extremely bad by making more growing environment data manipulatable.

By so configuring the plant growing environment control terminal, even if terminal users differ in technical level related to growth of plants, it is possible to provide a way to enjoy oneself according to each level and to promote every terminal user to more frequently use the system.

The plant growing environment control terminal is configured to include a proficiency degree management section confirming or managing a proficiency degree of a user related to growing of the plant, and configured so that if the proficiency degree confirmed or managed by the proficiency degree management section is high, the growing environment data reception supporting section can select one receiving parameter having a high degree of setting freedom. If so configuring the plant growing environment control terminal, it is possible to accurately provide receiving parameters according to the proficiency degree of each terminal user.

To prevent such a trouble as forgetting to receive image data, the plant growing environment control terminal is preferably configured so that the image data receiving section can be set to receive the image data automatically and regularly.

It is preferable, for example, that the plant growing environment control terminal is configured to include a transmission-reception status monitoring section monitoring at least one of a reception status of the image data and a transmission status of the growing environment data; and a notification section notifying that there is a problem with the transmission status or the reception status if the transmission-reception status monitoring section judges that there is a problem with the transmission status or the reception status.

Examples of the instance that "there is a problem with the transmission status or the reception status" include an instance in which the transmission or reception status does not conform to a preset transmission or reception rule such as an instance in which the image data that is to be received or the growing environment data that is to be transmitted every week is not received or not transmitted.

By so configuring the plant growing environment control terminal, it is possible to appropriately prevent such troubles as forgetting to receive image data and forgetting to transmit growing environment data.

The plant growing environment control terminal is configured to include a terminal-side passing time judging section judging whether predetermined time passes since seeding or budding when a setting change command to set or change the growing environment of the plant is received, and configured so that if the terminal-side passing time judging section judges that the predetermined time does not pass since the seeding or the budding, the setting change command is made unreceivable. By so configuring the plant growing environment control terminal, in a period from seeding to budding, the setting change command cannot be received, and it is possible to prevent, for example, a beginner terminal user unfamiliar with growth of plants from failing in growing plants in the period.

The plant growing environment control terminal is configured to include a component analysis data receiving section receiving component analysis data on an analysis of components of the plant being grown or having been harvested from the plant growing facility. By so configuring the plant growing environment control terminal, it is possible for the terminal user to specifically know and enjoy the components contained in the plant grown by his or her own way. It is also possible to use the component analysis data as a trigger to decide a specific action (for example, how to apply fertilizer next time).

According to another aspect of the present invention, there is provided a plant growing facility including: an imaging section picking up an image of a plant being grown; an image data transmitting section transmitting image data on the image picked up by the imaging section to a terminal including at least data transmission and reception functions and an image display function; a growing environment data receiving section receiving growing environment data for setting or changing a growing environment of the plant, the growing environment data transmitted from the terminal to correspond to the image data transmitted by the image data transmitting section, the growing environment including an irradiation light, a temperature, and a humidity; and a growing environment control section controlling the growing environment of the plant corresponding to the image data according to one of the growing environment data received by the growing environment data receiving section and default growing environment data.

To prevent such a trouble as forgetting to transmit image data, the image data transmitting section can be preferably set to transmit the image data automatically and regularly.

The plant growing facility is used by and shared among a plurality of users so as to grow plants, respectively, and at least the growing environment control section out of the imaging section, the image data transmitting section, the growing environment data receiving section, and the growing environment control section is provided for each of the plurality of terminal users. By so configuring the plant growing facility, the plant growing facility can be used as a so-called kitchen garden. Further, by sharing the plant growing facility among the terminal users, it is possible to use the plant growing facility at relatively low cost as compared with an instance of individually preparing for and using the plant growing facility.

To control the growing environment of the plant so as to provide a desired growing environment, the plant growing facility is preferably configured so that the growing environment control section controls at least one of the light illuminating apparatus for irradiation light control, the temperature controller for temperature control, the mist spray device for humidity control, the $CO_2$ supply device for $CO_2$ concentration control, and the fertilizer supply device for supply of fertilizer.

If the plant growing facility is configured to include a growing environment measuring section measuring the growing environment under control of the growing environment control section; and a growing environment measurement data transmitting section transmitting growing environment measurement data measured by the growing environment measuring section to each of the terminals, each of the terminal can know specific values of the growing environment, which can contribute to accurate setting of the growing environment data in each terminal.

To know the growing environment of the plant as specific values, the plant growing facility is preferably configured so that the growing environment measuring section includes at least one of a light intensity sensor, a temperature sensor, a humidity sensor, a $CO_2$ concentration sensor, and a fertilizer analysis sensor.

To improve user-friendliness of the plant growing environment control terminal such as lessening of operation burden on the plant growing environment control terminal, the plant growing facility is preferably configured to include a receiving parameter storage section storing receiving parameters for promoting each plant growing environment control terminal to receive the growing environment data; and a receiving parameter transmitting section transmitting the receiving parameters stored in the receiving parameter storage section to the plant growing environment control terminal.

To prevent such a terminal user unfamiliar with growth of plants as a beginner from failing at an initial growing stage, the plant growing facility is preferably configured to include a facility time elapse judging section judging whether predetermined time passes since seeding or budding when a setting change command to set or change the growing environment of the plant is received, and configured so that if the facility time elapse judging section judges that the predetermined time does not pass since the seeding or the budding, the setting change command is made unreceivable.

If the plant growing facility is configured to include a component analysis data transmitting section transmitting component analysis data on the plant being grown or having been harvested to each plant growing environment control terminal, it is possible to specifically notify the plant growing environment control terminal of components contained in the plant grown by his or her own way.

A preferable remote plant growing system according to the present invention is a remote plant growing system including: a plant growing facility configured to control a growing environment of a plant based on growing environment data for setting or changing the growing environment, the growing environment including an irradiation light, a temperature, and a humidity; and a plant growing environment control terminal bidirectionally communicable with the plant growing facility, wherein the plant growing facility includes an imaging section picking up an image of the plant being grown; an image data transmitting section transmitting image data on the image picked up by the imaging section to the plant growing environment control terminal; a growing environment data receiving section receiving the growing environment data transmitted from the plant growing environment control terminal to correspond to the image data transmitted by the image data transmitting section; and a growing environment control section controlling the growing environment of the plant corresponding to the image data according to one of the growing environment data received by the growing environment data receiving section and default growing environment data, and the plant growing environment control terminal includes an image receiving section receiving the image data from the plant growing facility; an image display section displaying the image of the plant based on the image data received by the image data receiving section; a growing environment data receiving section receiving the growing environment data; and a growing environment data transmitting section transmitting the growing environment data received by the growing environment data receiving section to the plant growing facility.

If the plant growing environment control terminal configured as stated above is used, an end consumer (which is a wide concept including not only those eating and consuming plants but also those only appreciating plants) can set growing environment data reflecting his or her own way and to grow his or her plant in the plant growing facility at user's desired time from a remote place from the plant growing facility. Further, it is possible to save time and labor for going to the plant growing facility to tend the plant.

Furthermore, as stated, the end consumer can grow his or her plant by his or her own way without the need to bother to visit the place where the farm is present by the train, the car or the like. It is, therefore, possible to, for example, provide a new lifestyle to an end consumer living in the city. For example, the present invention can realize a new and different way to enjoy himself or herself and a new and different hobby such as everyone's bringing something to eat or appreciate to hold a tasting party, an appreciation event or the like by bringing the grown plant to the user's home. At that time, the end consumer can realize a dream or a desire of growing the plant as desired, thus producing a so-called healing effect of promoting the stress incidental to modern people to be gotten rid of.

Moreover, particularly since the end consumer can specifically grasp a process of growing using images, it is possible to produce an effective educational effect to children or the like. Namely, even if the user fails to grow the plant quite well, it is possible to confirm the failure as images. Alternatively, it is possible to enhance a learning effect as to how the plant tastes good or how the growth of the plant fails by bringing the plant home and eating it.

Namely, it is possible to provide an excellent plant growing environment control terminal that enables a terminal user to grow a plant by his or her own way while confirming a process of growth using images, that can effectively produce a so-called healing effect, and that can produce an effective educational effect related to growth of the plant.

DESCRIPTION OF THE PREFERRED EMBODIMENTS

An embodiment of the present invention will be described hereinafter referring to the accompanying drawings.

Figure 1:
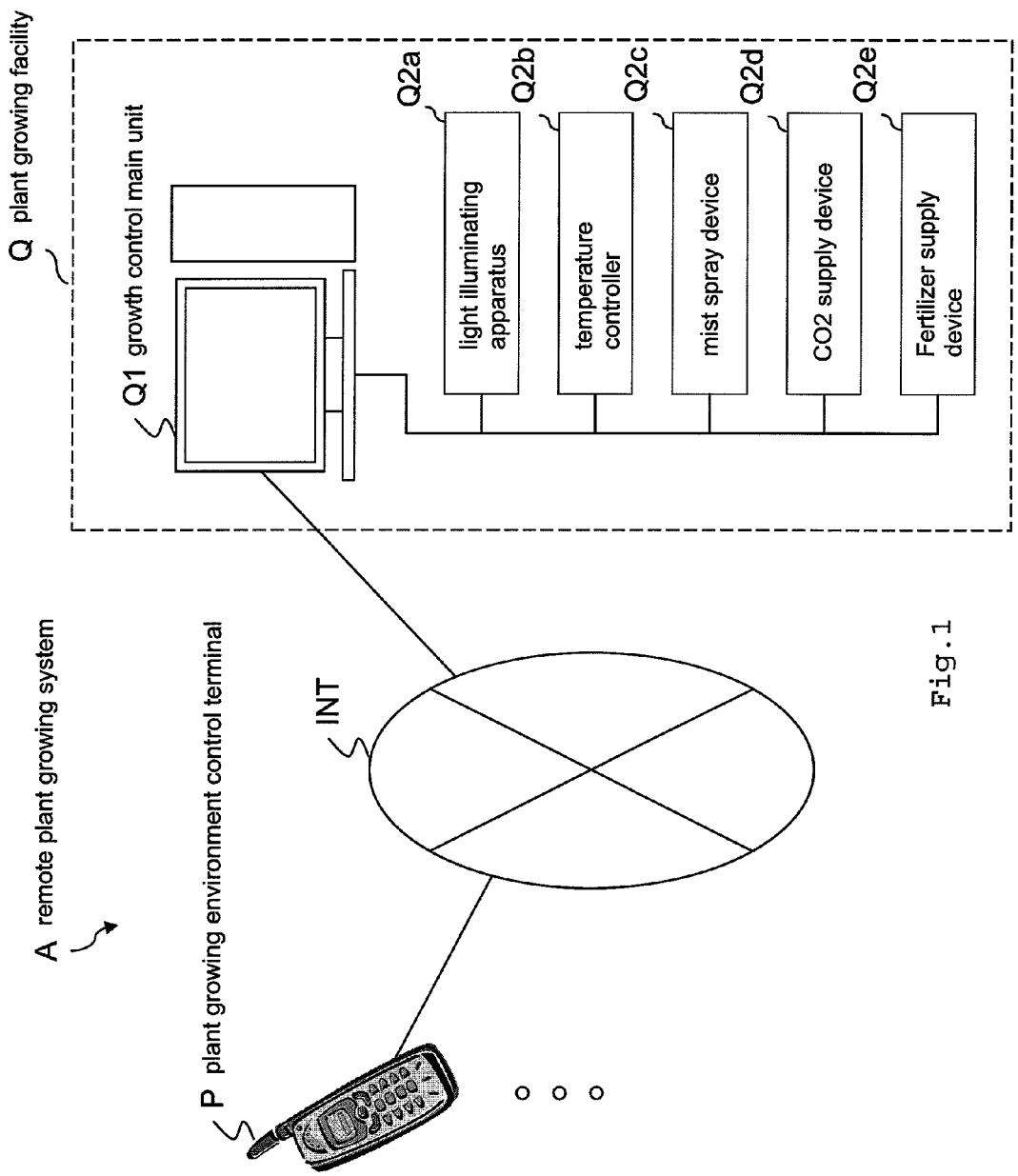
FIG. 1 is an overall configuration diagram showing a remote plant growing system including a plant growing environment control terminal and plant growing facility according to one embodiment of the present invention.

A plant growing environment control terminal P according to an embodiment of the present invention is disposed per terminal user (per end consumer). As shown in FIG. 1, a plurality of plant growing environment control terminals P is configured to be able to be shared among a plurality of terminal users, respectively, and is communicably connected to a plant growing facility Q for growing plants configured to control a plant growing environment such as an irradiation light, a temperature, and a humidity based on growing environment data for setting or changing the growing environment, via a communication line network such as the Internet INT. The plant growing environment control terminals P and the plant growing facility Q constitute a remote plant growing system A. The plant growing environment control terminals P and the plant growing facility Q will now be described specifically.

Figure 2:
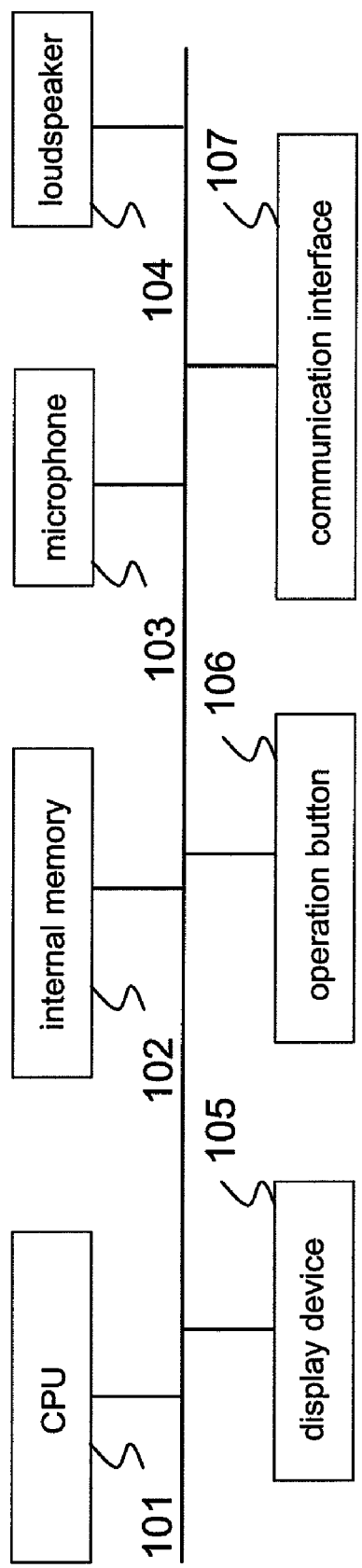
FIG. 2 is a block diagram of the plant growing control terminal according to the embodiment.

Each of the plant growing environment control terminals P is a portable terminal including not only ordinary information processing functions but also wireless data transmission and reception functions and an image display function. As shown in FIG. 2, the plant growing environment control terminal P includes such main constituent elements as a CPU 101, an internal memory 102, a microphone 103, a loudspeaker 104, a display device 105 displaying images or the like, an operation button 106 receiving an input operation and the like from the end user, a communication interface 107 including an antenna section for communicating with base stations (not shown), and a battery (not shown) supplying power to the CPU 102, the internal memory 102, and peripherals. In the present embodiment, a portable telephone serves as the plant growing environment control terminal P. Alternatively, a PHS, a PDA, a notebook personal computer or a desktop personal computer can be used as the plant growing environment control terminal P.

Figure 4:
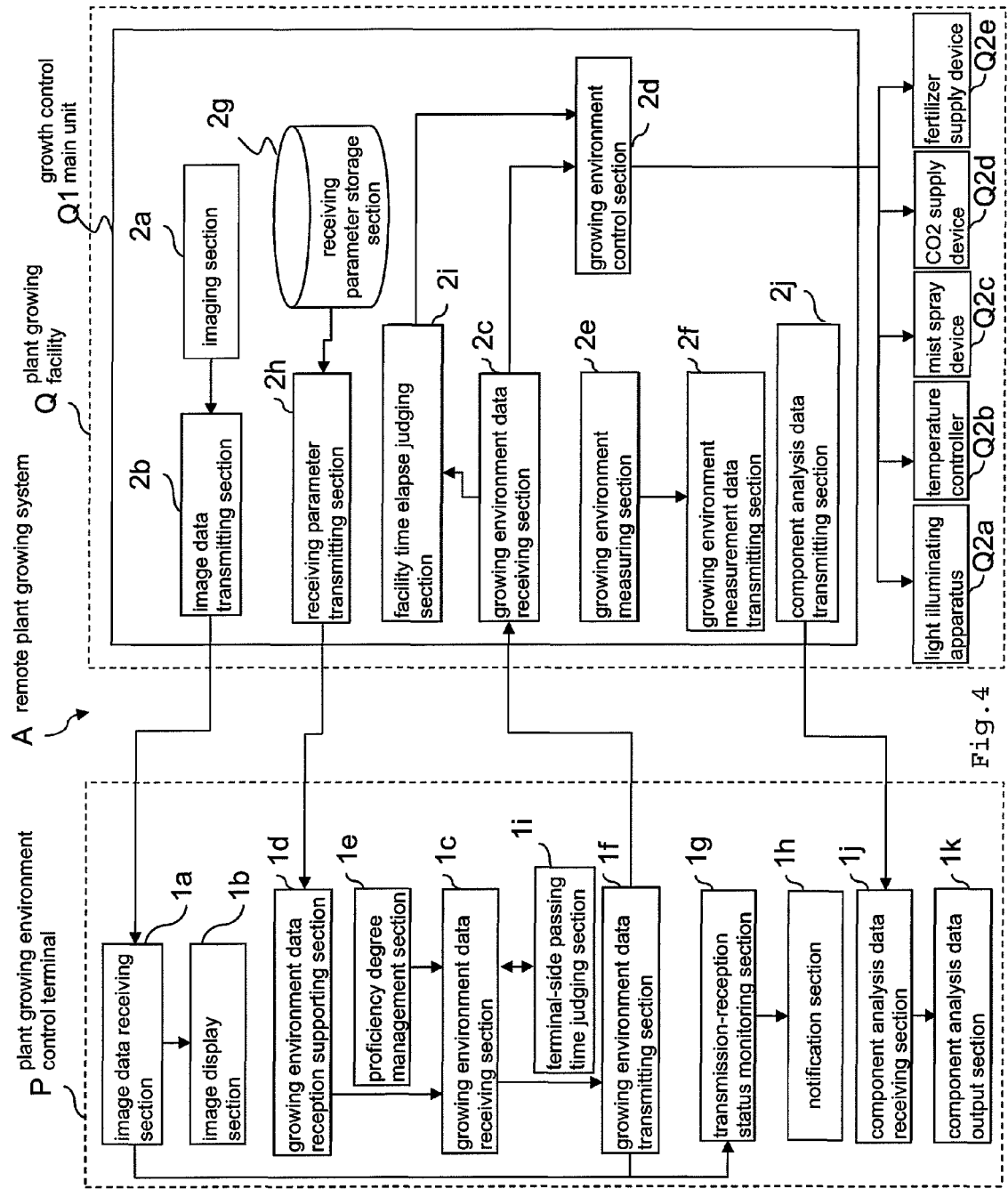
FIG. 4 is a functional configuration diagram of the plant growing environment control terminal and the plant growing facility according to the embodiment.

The plant growing environment control terminal P actuates the CPU 101 and the peripherals according to a terminal plant growing environment control program stored in the internal memory 102. As shown in FIG. 4, the plant growing environment control terminal P can fulfill functions as an image data receiving section 1a, an image display section 1b, a growing environment data receiving section 1c, a growing environment data reception supporting section 1d, a proficiency degree management section 1e, a growing environment data transmitting section 1f, transmission-reception status monitoring section 1g, a notification section 1h, a terminal-side passing time judging section 1i, a component analysis data receiving section 1j, a component analysis data output section 1k, and the like.

The image data receiving section 1a receives image data on a plant being grown or having harvested from the plant growing facility Q, and is configured to use the communication interface 107 or the like. In the present embodiment, by user's appropriately operating the operation button 106 or the like, the image data receiving section 1a can receive the image data automatically and regularly (e.g., at every noon).

The image display section 1b displays an image of the plant based on the image data received by the image data receiving section 1a, and is configured to use the display device 105 or the like.

The growing environment data receiving section 1c receives the growing environment data and is configured to use the operation button 106 or the like. In the present embodiment, the growing environment data receiving section 1c is configured to receive the growing environment data using the growing environment data reception supporting section 1d to be described later.

The growing environment data reception supporting section 1d selectably displays receiving parameters for promoting the growing environment data receiving section 1c to receive the growing environment data, and is configured to use the display device 105, the operation button 106 or the like.

Examples of the receiving parameters selectably displayed include beginner receiving parameters, to be described later, for guaranteeing taste to some extent by fixing predetermined growing environment data among a plurality of pieces of growing environment data, and senior receiving parameters, to be described later, for possibly making taste extremely attractive or extremely bad by making more growing environment data manipulatable.

The proficiency degree management section 1e confirms or manages a proficiency degree of the terminal user related to plant growing. Examples of a proficiency degree confirming method include a self-enumeration method of causing the terminal user to make a self enumeration by allowing the terminal user to select one of "high", "medium", and "low" as the proficiency degree. Examples of a proficiency degree managing method include a managing method including judging that the proficiency degree is higher if the number of times of operation for setting or changing the growing environment data is larger.

If the proficiency degree confirmed or managed by the proficiency degree management section 1e is high, the growing environment data reception supporting section 1d can select a receiving parameter having a high degree of setting freedom.

The growing environment data transmitting section 1f transmits the growing environment data received by the growing environment data receiving section 1c to the plant growing facility Q, and is configured to use the communication interface 107 or the like.

The transmission-reception status monitoring section 1g monitors a reception status in which the image data receiving section 1a receives the image data and a transmission status in which the growing environment data transmitting section 1f transmits the growing environment data.

The notification section 1h notifies the terminal user that there is a problem with the transmission or reception status if the transmission-reception status monitoring section 1g judges that there is a problem with the transmission or reception status. The instance that "there is a problem with the transmission or reception status" includes, for example, an instance in which the image data receiving section 1a does not receive image data against a reception rule of receiving image data every day and an instance in which the growing environment data transmitting section 1f does not transmit the growing environment data against a transmission rule of transmitting the growing environment data every day. These rules can be either set arbitrarily by each terminal user or set in advance. Furthermore, in the present embodiment, each terminal user is notified that there is a problem with the transmission or reception status by displaying the notification on a screen. Alternatively, the terminal user may be notified by reproducing sound (e.g., alarm sound or voice) from the loudspeaker or by using a vibration generated from a vibrator.

The terminal-side passing time judging section 1i judges whether predetermined time passes since seeding or budding when the plant growing environment control terminal P receives a setting change command to set or change the plant growing environment. If the terminal-side passing time judging section 1i judges that predetermined time does not passes since seeding or budding, the plant growing environment control terminal P can not receive the setting change command.

The component analysis data receiving section 1j receives component analysis data on analysis of components of each plant being grown or having been harvested from the plant growing facility Q, and is configured to use the communication interface 107 or the like.

The component analysis data output section 1k outputs the component analysis data received by the component analysis data receiving section 1j to be displayed, and is configured to use the display device 105 or the like. The component analysis data is set to be displayed in text. Alternatively, the display form can be appropriately changed or modified to, for example, a graphical form. In another alternative, the component analysis data can be printed out from an external printer (not shown).

The plant growing facility Q is configured to include a growth control main unit Q1 mainly controlling plant growth, a light illuminating apparatus Q2a controlling an irradiation light, a temperature controller Q2b controlling a temperature, a mist spray device Q2c controlling a humidity, a $CO_2$ supply device Q2d controlling a $CO_2$ concentration, and a fertilizer supply device Q2e supplying a fertilizer. The devices Q2a to Q2e are controlled by the main growing control section Q1. In the present embodiment, among these constituent elements, the growth control main unit Q1 is arranged in a management room (not shown) whereas those other than the growth control main unit Q1 are arranged in a hydroponic greenhouse 3.

Figure 5:
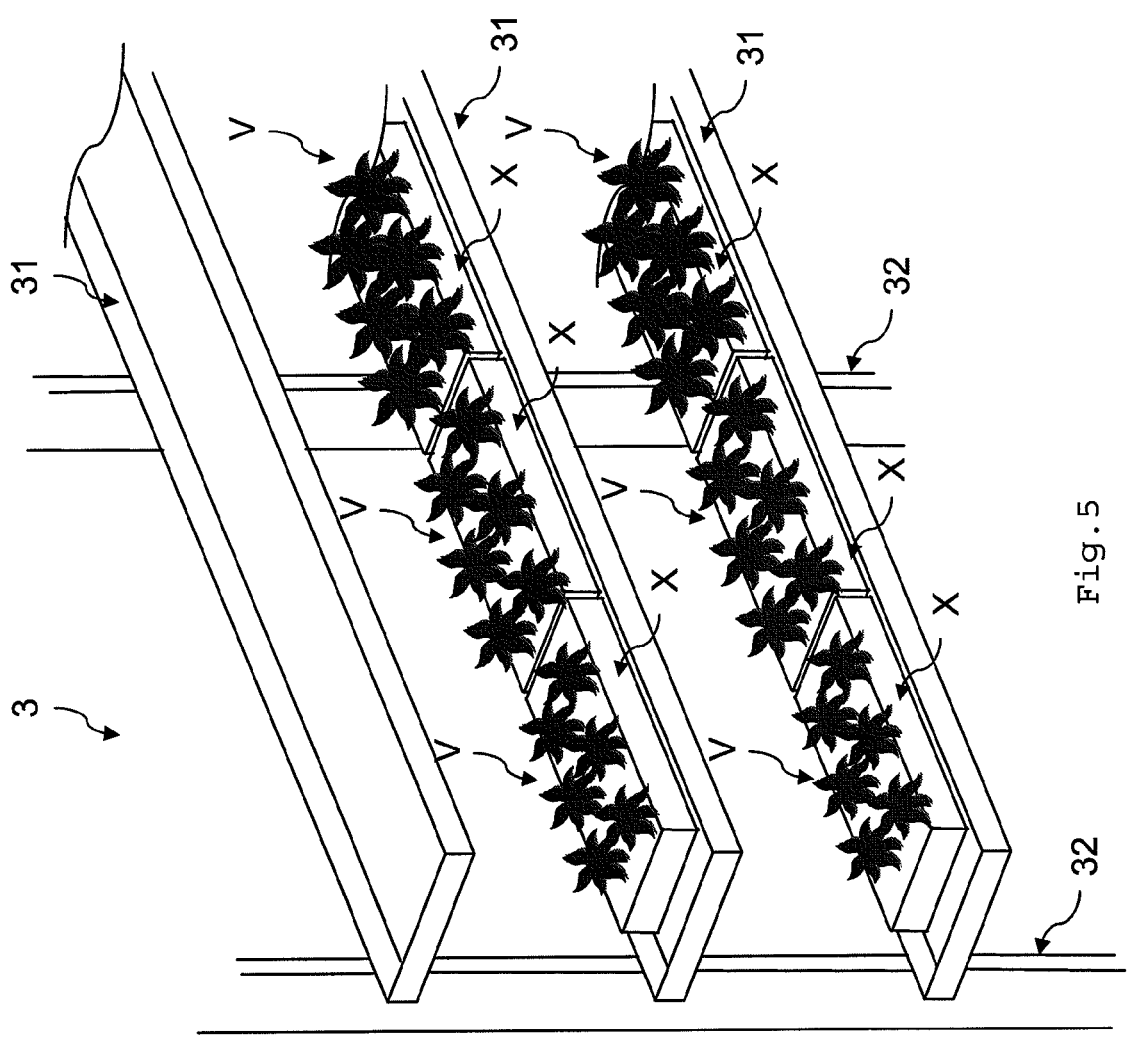
FIG. 5 is a schematic diagram showing principal parts of an interior of a hydroponic greenhouse according to the embodiment.
Figure 6:
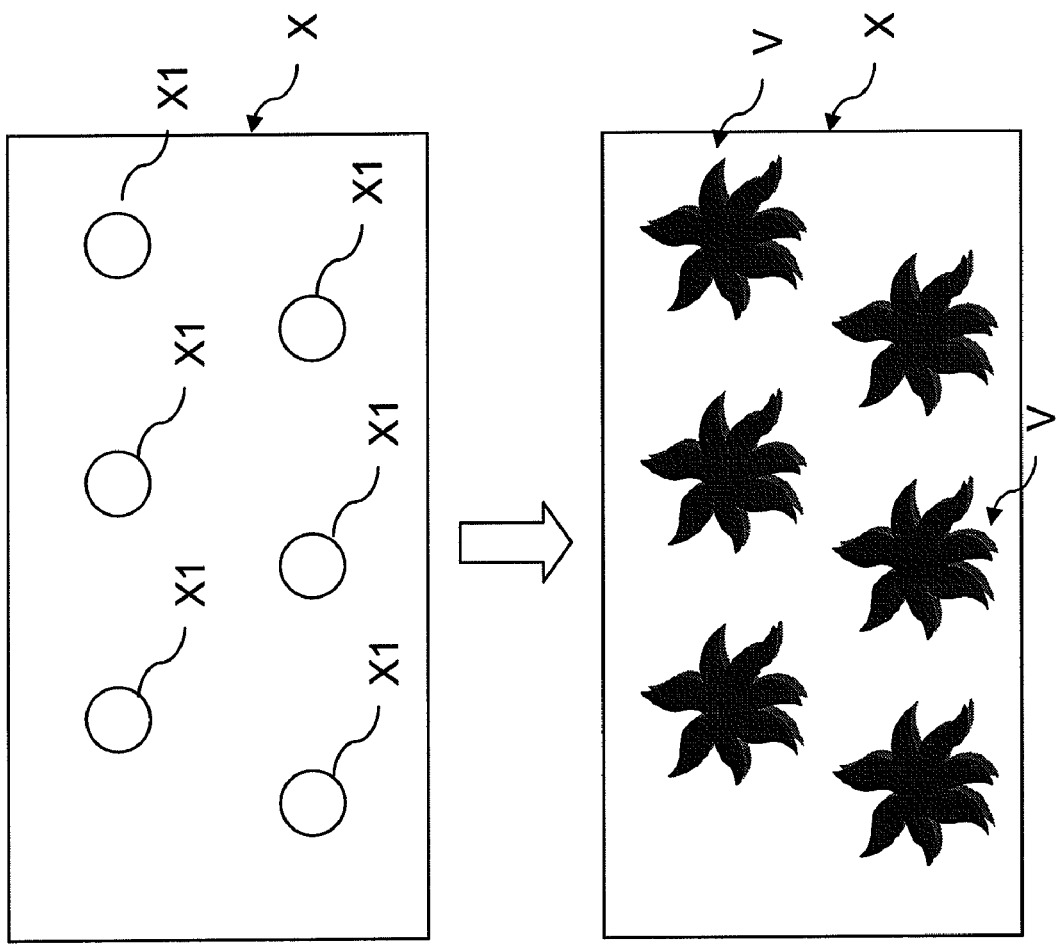
FIG. 6 is a schematic diagram showing a culture pallet according to the embodiment.

Specifically, the hydroponic greenhouse 3 includes shelves 31 on which a plurality of culture pallets X is mounted in an aligned fashion and a shelf support 32 supporting the plural shelves 31 as shown in FIG. 5. More specifically, each of the shelves 31 is a generally box-shaped shelf having an open upper surface. A liquid fertilizer inlet (not shown) to which a liquid fertilizer is input is provided on one end of the shelf 31 whereas a liquid fertilizer outlet (not shown) from which the liquid fertilizer that circulated in the shelf 31 is discharged. In the present embodiment, each of the shelves 31 is configured to be able to place twelve culture pallets X in an aligned fashion. The number of culture pallets X corresponds to days necessary to harvest lettuces V in the hydroponic greenhouse 3. The number of culture pallets X can be appropriately changed. Further, as shown in FIG. 6, culture holes X1 are formed in each of the culture pallets X so as to be able to cultivate six lettuces V. The number of culture holes X1 is changeable similarly to the number of culture pallets X. Moreover, a type of the plant to be grown is appropriately changeable.

Before starting explanation of the growth control main unit Q1, the light illuminating apparatus Q2a, the temperature controller Q2b, the mist spray device Q2c, the $CO_2$ supply device Q2d, and the fertilizer supply device Q2e will be described.

The light illuminating apparatus Q2a is configured to be able to irradiate a pulsed light having an irradiation cycle of 2 microseconds (μsec) to 1 μsec and a duty ratio (DT ratio) of 20% to 70% using a light emitting diode that emits a white light as a light source to a plant. The light illuminating apparatus Q2a is attached to a lower surface of each of the shelves 31 (although the light illuminating apparatus Q2a is not shown in FIG. 5). Namely, each light illuminating apparatus Q2a uses the light emitting diode provided on the upper shelf 31. In the present embodiment, the growth control main unit Q1 controls the irradiation cycle and the DT ratio.

The temperature controller Q2b uses a Peltier element so as to be able to increase or decrease the temperature using one device, and is attached to a lower surface of each shelf 31 (although the temperature controller Q2b is not shown in FIG. 5). Namely, the temperature controller Q2b uses the Peltier element provided on the upper shelf 31. Alternatively, the temperature controller Q2b may be configured to either increase or decrease the temperature. In the present embodiment, the growth control main unit Q1 controls operating time of the Peltier element.

The mist spray device Q2c transforms water taken in from a water pipe (not shown) into vapor mist and sprays the vapor mist from a mist spray port (not shown), thereby keeping the humidity near the plant and auxiliarily supplying water to the plant. The mist spray device Q2c is provided on the lower surface of each shelf 31 (although the mist spray device Q2c is not shown in FIG. 5). Namely, each mist spray device Q2c uses the mist spray port (not shown) provided on the upper shelf 31. In the present embodiment, the growth control main unit Q1 controls spray time of the vapor mist.

The $CO_2$ supply device Q2d sprays carbon dioxide from a carbon dioxide gas supply port (not shown) connected to a carbon dioxide gas cylinder (not shown), thereby accelerating photosynthesis of the plant, and is provided on the lower surface of each shelf 31 (the CO2 supply device Q2d is not shown in FIG. 5). Namely, each $CO_2$ supply device Q2d uses the carbon dioxide gas supply port provided on the upper shelf 31. In the present embodiment, the growth control main unit Q1 controls supply time of carbon dioxide.

The fertilizer supply device Q2e supplies a liquid fertilizer obtained by appropriately mixing, for example, such nutriments as nitrogen, phosphoric acid, potassium, caustic lime, sulfur, iron, boron, manganese, zinc, molybdenum, copper, chloride, silicon, cobalt, vanadium, aluminum, and selenium with water from a fertilizer supply port into the shelves 31 (the fertilizer supply device Q2e is not shown in FIG. 5). In the present embodiment, the growth control main unit Q1 controls a supply amount of the liquid fertilizer and a component ratio of the nutriments.

Figure 3:
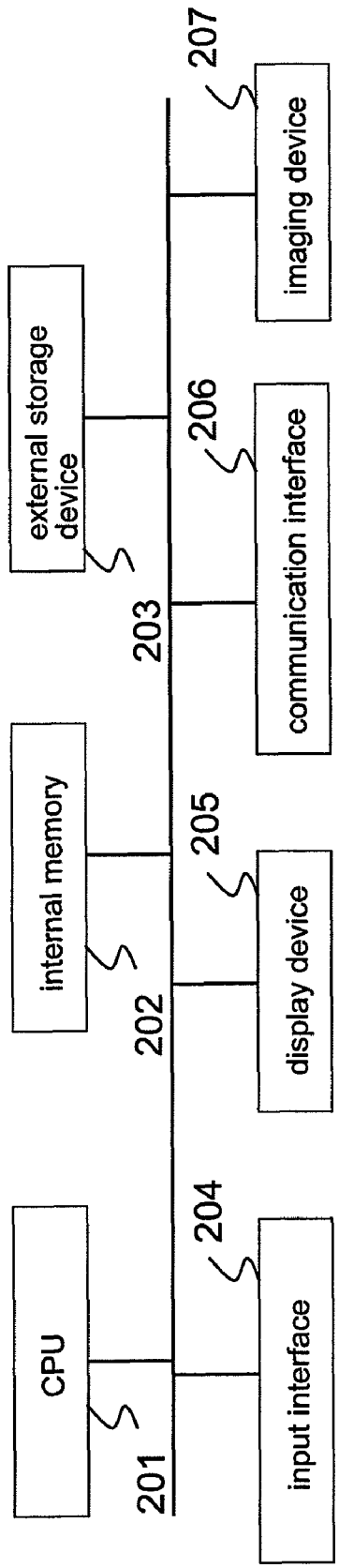
FIG. 3 is a block diagram of the plant growing facility according to the embodiment.

The growth control main unit Q1 includes ordinary information processing functions. As shown in FIG. 3, the growth control main unit Q1 is configured to include a CPU 201, an internal memory 202, an external storage device 203 such as a HDD, an input interface 204 such as a mouse and a keyboard, a display device 205 such as a liquid crystal display, a communication interface 206 connecting the growth control main unit Q1 to a communication line network such as an in-house LAN or the Internet INT, an imaging device 207 such as a digital camera, and the like.

The growth control main unit Q1 actuates the CPU 201 and the peripherals according to a main growing control program stored in the internal memory 202. As shown in FIG. 4, the growth control main unit Q1 can fulfill functions as an imaging section 2a, an image data transmitting section 2b, a growing environment data receiving section 2c, a growing environment control section 2d, a growing environment measuring section 2e, a growing environment measurement data transmitting section 2f, a receiving parameter storage section 2g, a receiving parameter transmitting section 2h, a facility time elapse judging section 2i, a component analysis data transmitting section 2j, and the like. The respective sections of the growth control main unit Q1 will now be described.

The imaging section 2a picks up an image of the plant being grown and is configured to use the imaging device 207 or the like.

In the present embodiment, the imaging device 207 is provided per terminal user so as to automatically image the plant of each terminal user at a fixed point. However, the present invention is not limited thereto. For example, the imaging section 2a may receive an image picked up at a fixed point by each user using the imaging device 207 or the image of the plant may be picked up while appropriately moving one imaging device 207 within the hydroponic greenhouse 3.

The image data transmitting section 2b transmits image data on the image picked up by the imaging section 2a to each of the plant growing environment control terminals P, and is configured to use the communication interface 206 or the like. In the present embodiment, the image data transmitting section 2b is set to transmit the image data automatically and regularly (e.g., at every noon) by user's appropriately operating the input interface 204 or the like.

The growing environment data receiving section 2c receives the growing environment data transmitted from each of the plant growing environment control terminals P to correspond to the image data transmitted from the image data transmitting section 2b, and is configured to use the communication interface 206 or the like.

The growing environment control section 2d controls a growing environment of the corresponding plant according to the growing environment data received by the growing environment data receiving section 2c or default growing environment data. In the present embodiment, this growing environment control section 2d controls the light illuminating apparatus Q2a, the temperature controller Q2b, the mist spray device Q2c, the $CO_2$ supply device Q2d, and the fertilizer supply device Q2e. However, the number of devices controlled by the growing environment control section 2d can be appropriately changed according to embodiments.

The growing environment measuring section 2e measures the growing environment under control of the growing environment control section 2d. In the present embodiment, the growing environment measuring section 2e is configured to include a light intensity sensor, a temperature sensor, a humidity sensor, a CO2 concentration sensor, and a fertilizer analysis sensor (all of which are not shown).

The growing environment measurement data transmitting section 2f transmits the growing environment measurement data measured by the growing environment measuring section 2e to each of the plant growing environment control terminals P, and is configured to use the communication interface 206 or the like. A transmission timing of the growing environment measurement data transmitting section 2f may be either a timing of a transmission request from each of the plant growing environment control terminals P or a regular timing.

The receiving parameter storage section 2g stores receiving parameters for promoting each of the plant growing environment control terminals P to receive the growing environment data, and is formed in a predetermined region of the internal memory 202 or the external storage device 203.

The receiving parameters include beginner receiving parameters and senior receiving parameters, and are stored as default data. The beginner receiving parameters set a component ratio of all the nutriments supplied by the fertilizer supply device Q2e. The senior receiving parameters set a component ratio of about half of the nutriments that can be supplied by the fertilizer supply device Q2e.

The receiving parameter transmitting section 2h transmits the receiving parameters stored in the receiving parameter storage section 2g to each of the plant growing environment control terminals P, and is configured to use the communication interface 206 or the like.

The facility time elapse judging section 2i judges whether predetermined time passes since seeding or budding when each plant growing environment control terminal P receives a setting change command to set or change the plant growing environment.

If the facility time elapse judging section 2i judges that predetermined time does not passes since seeding or budding, the growing environment control section 2d does not exert control according to the growing environment data related to the setting change command.

The component analysis data transmitting section 2j transmits component analysis data on each plant being grown or having been harvested to each of the plant growing environment control terminals P, and is configured to use the communication interface 206 or the like. In the present embodiment, the component analysis data is transmitted to each plant growing environment control terminal P using electronic mail after converting data obtained by appropriately analyzing the components by a manager or the like of the plant growing facility Q into a text form or an attached data form. However, the present invention is not limited thereto. All processes from analysis to transmission can be automated.

Examples of operations performed by each of the plant growing environment control terminals P and the plant growing facility Q configured as stated above will be described referring to flowcharts.

(1) Operation Performed by Plant Growing Environment Control Terminal P

Figure 7:
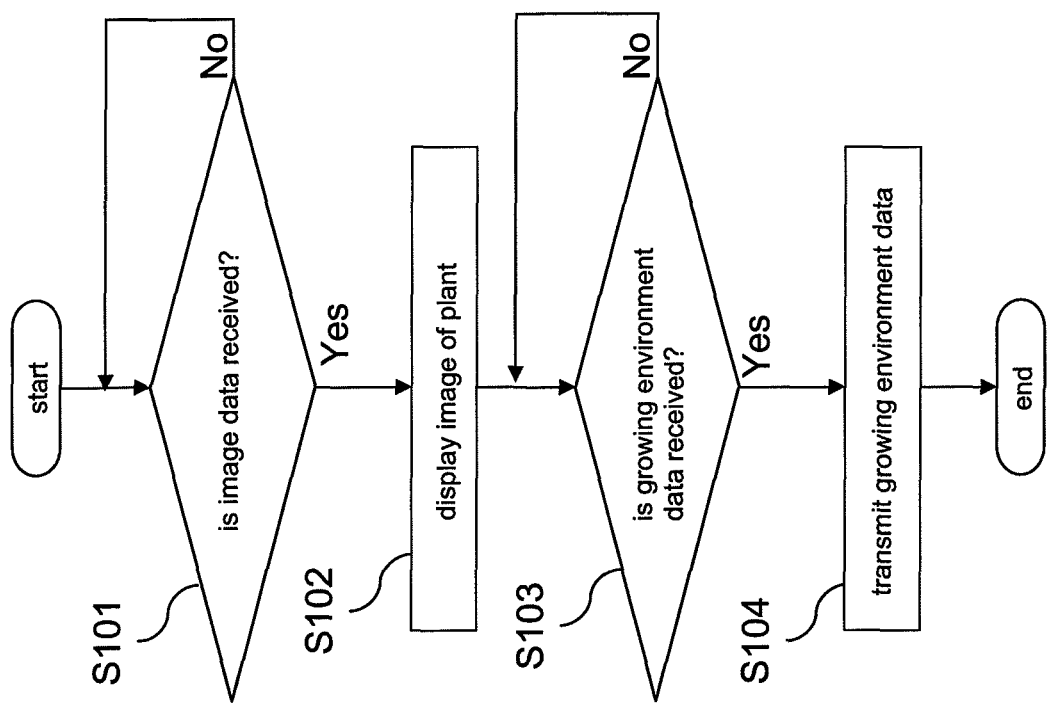
FIG. 7 is a flowchart showing operation performed by the plant growing environment control terminal according to the embodiment.

As shown in FIG. 7, if the image data receiving section 1a first receives image data on a plant being grown or having been harvested from the plant growing facility Q (step S101), the image display section 1b displays an image of the plant based on the image data received by the image data receiving section 1a (step S102).

If the growing environment data receiving section 1c receives growing environment data (step S103), the growing environment data transmitting section 1f transmits the growing environment data received by the growing environment data receiving section 1c to the plant growing facility Q (step S104).

If the step S103 is to be executed, then the proficiency degree management section 1e confirms the proficiency degree of the terminal user involved in growing of the plant, and the growing environment data reception supporting section 1d selectably displays the receiving parameters for promoting the growing environment data receiving section 1c to receive the growing environment data. Further, the terminal-side passing time judging section 1i judges whether predetermined time passes since seeding or budding when the plant growing environment control terminal P receives a setting change command related to the growing environment data.

Figure 8:
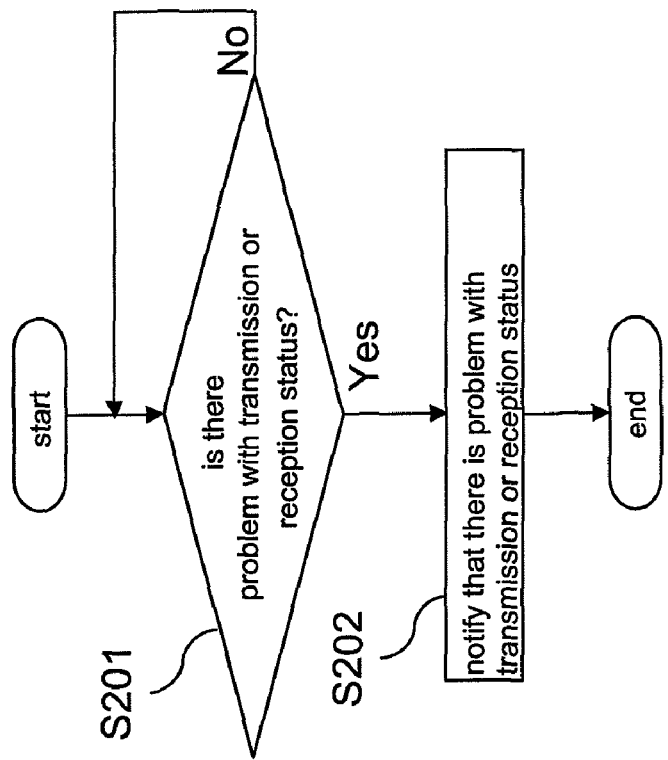
FIG. 8 is a flowchart showing operation performed by the plant growing environment control terminal according to the embodiment.

As shown in FIG. 8, if the transmission-reception status monitoring section 1g judges that there is a problem with the reception status in which the image data receiving section 1a receives the image data or the transmission status in which the growing environment data transmitting section 1f transmits the growing environment data (step S201), the notification section 1h notifies the terminal user that there is a problem with the transmission or reception status (step S202).

Figure 9:
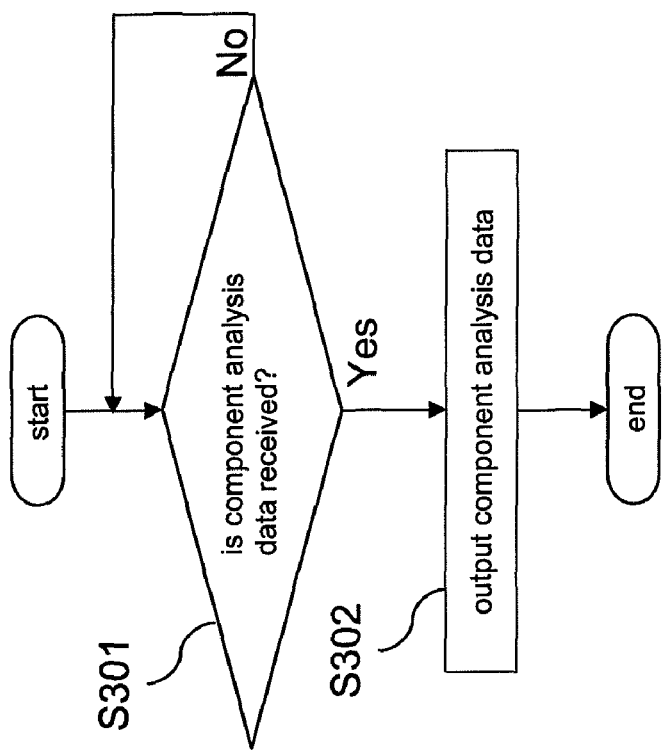
FIG. 9 is a flowchart showing operation performed by the plant growing environment control terminal according to the embodiment.

As shown in FIG. 9, if the component analysis data receiving section 1j receives component analysis data from the plant growing facility Q (step S301), the component analysis data output section 1k outputs the component analysis data received by the component analysis data receiving section 1j to be displayed (step S302).

It is to be noted that the steps S101 to S104, the steps S201 to S202, and the steps S301 to S302 can be processed in parallel to one another.

Figure 10:
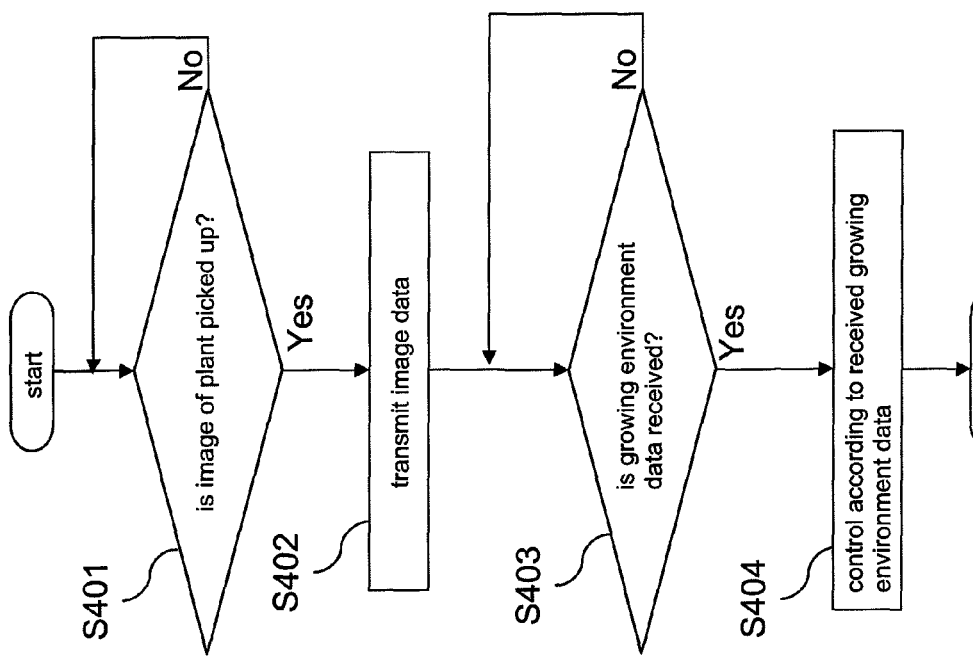
FIG. 10 is a flowchart showing operation performed by a growth control main unit according to the embodiment.

(2) Operation Performed by Growth Control Main Unit Q1 of Plant Growing Facility Q As shown in FIG. 10, if the imaging section 2a first picks up an image of a plant being grown (step S401), the image data transmitting section 2b transmits image data on the image picked up by the imaging section 2a to each of the plant growing environment control terminals P (step S402). At this time, the receiving parameter transmitting section 2h transmits the receiving parameters stored in the receiving parameter storage section 2g to each of the plant growing environment control terminals P.

If the growing environment data receiving section 2c receives the growing environment data transmitted from each of the plant growing environment control terminals P to correspond to the image data transmitted from the image data transmitting section 2b (step S403), the growing environment control section 2d controls a growing environment of the corresponding plant according to the growing environment data received by the growing environment data receiving section 2c (step S404). If the growing environment data receiving section 2c does not receive the growing environment data from each of the plant growing environment control terminals P for a predetermined period, the growing environment control section 2d controls the growing environment of the plant based on the default growing environment data stored in the external storage device in advance. At the time of executing the step S404, if the facility time elapse judging section 2i judges that predetermined time does not pass since seeding or budding, the growing environment control section 2d does not exert the control according to the growing environment data related to the setting change command.

Figure 11:
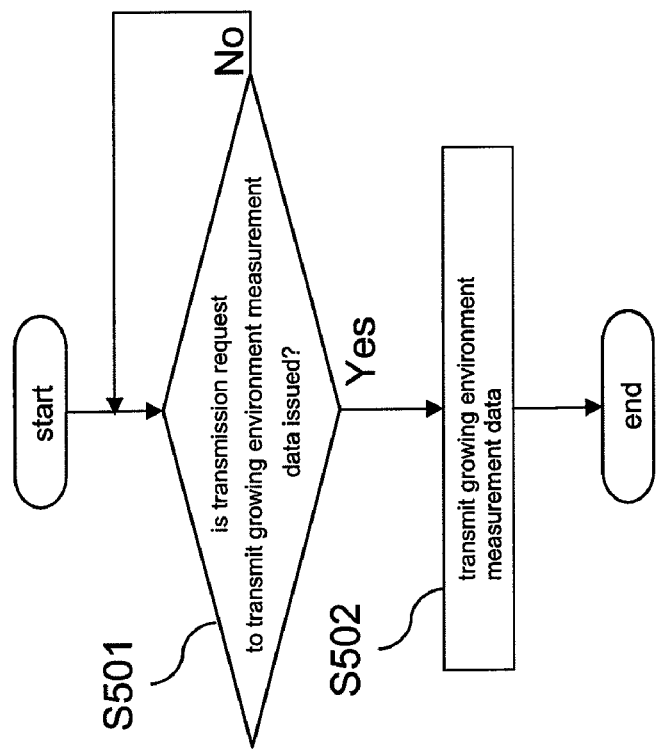
FIG. 11 is a flowchart showing operation performed by the growth control main unit according to the embodiment.

As shown in FIG. 11, if one of the plant growing environment control terminals P transmits a transmission request to transmit the growing environment measurement data to the plant growing facility Q (step S501), the growing environment measurement data transmitting section 2f transmits the growing environment measurement data measured by the growing environment measuring section 2e to the plant growing environment control terminal P (step S502).

Figure 12:
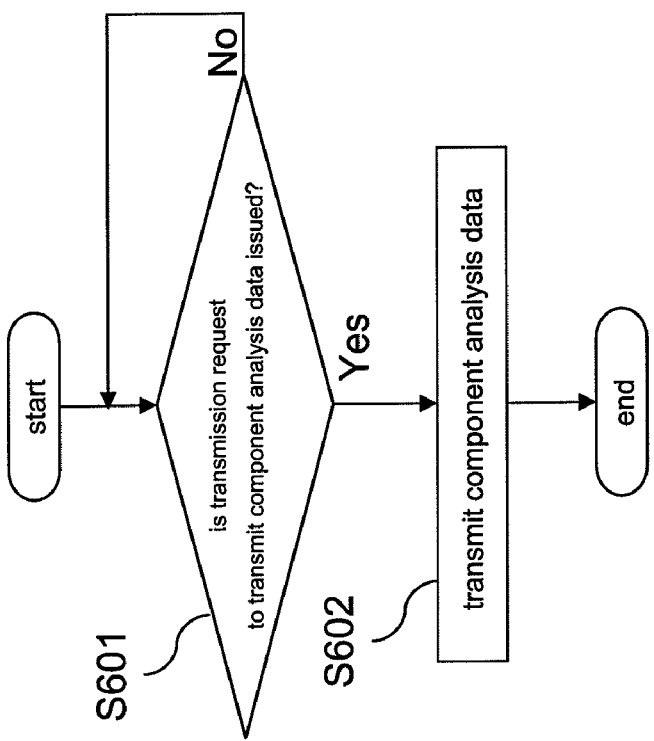
FIG. 12 is a flowchart showing operation performed by the growth control main unit according to the embodiment.

As shown in FIG. 12, if one of the plant growing environment control terminals P transmits a transmission request to transmit the component analysis data to the plant growing facility Q (step S601), the component analysis data transmitting section 2j transmits the component analysis data to the plant growing environment control terminal P (step S602).

As stated so far, the plant growing environment control terminal P according to the embodiment enables the terminal user to set growing environment data reflecting his or her own way and to grow his or her plant in the plant growing facility Q at user's desired time from a remote place from the plant growing facility Q. Further, it is possible to save time and labor for going to the plant growing facility Q to tend the plant. Since the terminal user can grow his or her plant by his or her own way without the need to bother to visit the place where the farm is present by the train, the car or the like, it is possible to, for example, provide a new lifestyle to a terminal user living in the city. For example, it is possible to provide a new and different way to enjoy himself or herself and a new and different hobby such as everyone's bringing something to eat or appreciate to hold a tasting party, an appreciation event or the like by bringing the grown plant to the user's home. Moreover, the user can order the plant grown by himself or herself at a restaurant (not shown) located in the plant growing facility Q or the like and enjoy eating the plant as so-called MY plant. At that time, the user can realize a dream or a desire of growing the plant as desired, thus producing a so-called healing effect of promoting the stress incidental to modern people to be gotten rid of.

Moreover, the user can specifically grasp a process of growing the plant from beginning to end because of the fixed-point observation in which images are picked up at the same place, thus producing an effective educational effect to children or the like. Namely, even if the user fails to grow the plant quite well, it is possible to confirm the failure as images. Alternatively, it is possible to enhance a learning effect as to how the plant tastes good or how the growth of the plant fails by bringing the plant home and eating it. Since the plants are grown using artificial light such as the light from the light emitting diode, the plants can be grown in shorter time than with the use of natural light. The educational effect and the learning effect can be thereby made quite effective.

Furthermore, a professional cook does an about-face on the way of entrusting the growth of plants to producers and grows the plants on his or her own way, thereby making it possible to use the plants by which the cook can sufficiently exhibit his or her ability as foodstuff. Therefore, it is also possible to provide not plants labeled with producers' names or names of places of production but plants labeled with an original band of the professional cook.

Namely, it is possible to provide an excellent plant growing environment control terminal P that enables a terminal user to grow a plant by his or her own way while confirming a process of growth using images, that can effectively produce a so-called healing effect, that can produce an effective educational effect related to growth of the plant, and that enables harvesting a plant extremely good in taste so that the plant can be discriminated from the other plants.

Since the plant growing environment control terminal P is a portable telephone including at least the data transmission and reception functions and the image display function, the growing environment data can be easily set at desired time wherever the user is.

The plant growing environment control terminal P is configured to include the growing environment data reception supporting section 1d selectably displaying receiving parameters for promoting the growing environment data receiving section 1 to receive the growing environment data. Due to this, even if terminal users differ in technical level related to growth of plants, it is possible to provide a way to enjoy oneself according to each level and to promote every terminal user to more frequently use the system.

The plant growing environment control terminal P is configured to include the proficiency degree management section 1e confirming or managing a proficiency degree of a terminal user related to growing of the plant. If the proficiency degree confirmed or managed by the proficiency degree management section 1e is high, the growing environment data reception supporting section 1d can select one receiving parameter having a high degree of setting freedom. It is, therefore, possible to accurately provide receiving parameters according to the proficiency degree of each terminal user.

The plant growing environment control terminal P is configured so that the image data receiving section 1a can be set to receive the image data automatically and regularly. It is, therefore, possible to prevent such a trouble as forgetting to receive image data.

The plant growing environment control terminal P is configured to include the transmission-reception status monitoring section 1g monitoring at least one of a reception status of the image data and a transmission status of the growing environment data; and the notification section 1h notifying that there is a problem with the transmission status or the reception status if the transmission-reception status monitoring section 1g judges that there is a problem with the transmission status or the reception status. It is, therefore, possible to appropriately prevent such troubles as forgetting to receive image data and forgetting to transmit growing environment data.

The plant growing environment control terminal P is configured to include the terminal-side passing time judging section 1i judging whether predetermined time passes since seeding or budding when a setting change command to set or change the growing environment of the plant is received. If the terminal-side passing time judging section 1i judges that the predetermined time does not pass since the seeding or the budding, the setting change command is made unreceivable. Due to this, in a period from seeding to budding, the setting change command cannot be received, and it is possible to prevent, for example, a beginner terminal user unfamiliar with growth of plants from failing in growing plants in the period.

The plant growing environment control terminal P is configured to include the component analysis data receiving section 1*j* receiving component analysis data on an analysis of components of the plant being grown or having been harvested from the plant growing facility Q. It is, therefore, possible for the terminal user to specifically know and enjoy the components contained in the plant grown by his or her own way. It is also possible to use the component analysis data as a trigger to decide how to apply fertilizer next time.

Moreover, the plant growing facility Q according to the present embodiment is configured to transmit an image related to the process of growing a plant to each of the plant growing environment control terminals P, and to control the growing environment of the plant based on the growing environment data transmitted to correspond to the image. Therefore, the terminal user can grow his or her plant by his or her own way without the need to bother to visit the plant growing facility Q. At that time, the terminal user can realize a dream or a desire of growing the plant as desired, thus producing a so-called healing effect of promoting the stress incidental to modern people to be gotten rid of. If the terminal user is a child in particular, the terminal user can specifically grasp a process of growing the plant using images, thus producing an effective educational effect. Even if the terminal user fails to grow the plant quite well, it is possible to confirm the failure as images. Besides, it is possible to enhance a learning effect as to how the growth of the plant fails. Furthermore, a professional cook does an about-face on the way of entrusting the growth of plants to producers and grows the plants on his or her own way, thereby making it possible to use the plant growing facility Q to harvest the plants by which the cook can sufficiently exhibit his or her ability as foodstuff. Therefore, it is also possible to provide not plants labeled with producers' names or names of places of production but plants labeled with an original band of the professional cook.

Namely, it is possible to provide the excellent plant growing facility P that enables even a terminal user located at a remote place to grow a plant by his or her own way while confirming a process of growth using images, that can effectively produce a so-called healing effect, that can produce an effective educational effect related to growth of plants, and that enables a plant extremely good in taste to be harvested, so that the plant can be discriminated from the other plants.

Further, the image data transmitting section 2*b* can be set to transmit the image data automatically and regularly. It is, therefore, possible to prevent such a trouble as forgetting to transmit image data.

At least the growing environment control section 2*d* out of the imaging section 2*a*, the image data transmitting section 2*b*, the growing environment data receiving section 2*c*, and the growing environment control section 2*d* is provided for each of the plurality of terminal users. Therefore, the plant growing facility Q can be used as a so-called kitchen garden. Further, by sharing the plant growing facility Q among the terminal users, it is possible to use the plant growing facility Q at relatively low cost as compared with an instance of individually preparing for and using the plant growing facility Q.

The plant growing facility Q is configured so that the growing environment control section 2*d* controls the light illuminating apparatus Q2*a*, the temperature controller Q2*b*, the mist spray device Q2*c*, the $CO_2$ supply device Q2*d*, and the fertilizer supply device Q2*e*. It is, therefore, possible to minutely control the growing environment of the plant so as to provide a desired growing environment.

The plant growing facility Q is configured to include the growing environment measuring section 2*e* measuring the growing environment under control of the growing environment control section 2*d*; and the growing environment measurement data transmitting section 2*f* transmitting growing environment measurement data measured by the growing environment measuring section 2*e* to each of the plant growing environment control terminals P. Therefore, the plant growing environment control terminal P can know specific values of the growing environment, which can contribute to accurate setting of the growing environment data in the plant growing environment control terminal P.

The plant growing facility Q is configured so that the growing environment measuring section 2*e* includes the light intensity sensor, the temperature sensor, the humidity sensor, the $CO_2$ concentration sensor, and the fertilizer analysis sensor. The growing environment of the plant can be, therefore, known as specific values.

The plant growing facility Q is configured to include the receiving parameter storage section 2*g* storing receiving parameters for promoting each plant growing environment control terminal P to receive the growing environment data; and the receiving parameter transmitting section 2*h* transmitting the receiving parameters stored in the receiving parameter storage section 2*g* to the plant growing environment control terminal P. It is, therefore, possible to improve user-friendliness of the plant growing environment control terminal P such as lessening of operation burden on the plant growing environment control terminal P.

The plant growing facility Q is configured to include the facility time elapse judging section 2*i* judging whether predetermined time passes since seeding or budding when a setting change command to set or change the growing environment of the plant is received. If the facility time elapse judging section 2*i* judges that the predetermined time does not pass since the seeding or the budding, the setting change command is made unreceivable. It is, therefore, possible to prevent such a terminal user unfamiliar with growth of plants as a beginner from failing at an initial growing stage.

The plant growing facility Q is configured to include the component analysis data transmitting section 2*j* transmitting component analysis data on the plant being grown or having been harvested to each plant growing environment control terminal P. It is, therefore, possible to specifically notify the plant growing environment control terminal P of components contained in the plant grown by his or her own way.

The present invention is not limited to the embodiment stated above.

For example, the plant growing facility Q is configured to include all of the light illuminating apparatus Q2*a*, the temperature controller Q2*b*, the mist spray device Q2*c*, the CO2 supply device Q2*d*, and the fertilizer supply device Q2*e* according to the embodiment. However, the plant growing facility Q may be configured to include one or more devices, for example, two out of these devices Q2*a* to Q2*e* (e.g., the light illuminating apparatus Q2*a* and the fertilizer supply device Q2*e*).

Furthermore, the devices controlled by the growing environment control section 2*d* are not limited to the respective devices stated above. For example, the controlled devices may be a fog generation device generating fog, a wind generation device producing wind, and a lightning control device realizing a sunshine state by turning on and off a light. It suffices that the controlled devices are those producing phenomena appearing as natural phenomena. The plant growing facility Q can be configured so that these devices are controlled by the growing environment control section 2*d*. However, control exerted by the growing environment control section 2*d* is not limited to that for realizing natural environment.

Moreover, the remote plant growing system can be configured to be able to display harvest age information indicating the number of days necessary for harvest from seeding to harvest and specified according to a breed, the number of weeks necessary for harvest or the like at appropriate timing. Specifically, data on lettuce and data on twelve as the number of days necessary for harvest are associated with each other and stored in a database. If one user selects the lettuce as a breed desired to be seeded, then the user refers to the database, and the information indicating that the number of necessary days is twelve can be displayed for the user.

Further, a plurality of breeds of plants can be grown at the same place and the same time, e.g., lettuce and tomato can be grown simultaneously. By doing so, it is possible to know common growing conditions optimum for growing the both at the same place and the same time.

Moreover, according to the present embodiment, the receiving parameters, i.e., the beginner receiving parameters and the senior receiving parameters are selectably stored as the default data according to the proficiency degree of the user. However, the present invention is not limited thereto. For example, the beginner receiving parameters and the senior receiving parameters can be made to correspond to plant growing stages (such as a seeding stage, a raising-of-seedling stage, and a growing stage).

Furthermore, if the growing environment data and the receiving parameters are to be output to the outside, not values themselves but relative values may be output. It is thereby possible to prevent the third party from unnecessarily using the growing environment data and the receiving parameters in systems other than the remote plant growing system.

Likewise, the plant component analysis data may be represented not as absolute values but as relative values. It is thereby possible to prevent the third party from unnecessarily using the plant component analysis data in systems other than the remote plant growing system.

Moreover, the growing environment measuring section 2e is configured to include all of the light intensity sensor, the temperature sensor, the humidity sensor, the $CO_2$ concentration sensor, and the fertilizer analysis sensor. However, it suffices that the growing environment measuring section 2e is configured to include one or more out of these sensors.

Further, the configurations of the shelves 31 and the shelf support 32 provided in the hydroponic greenhouse 3 are not limited to those described in the present embodiment.

Furthermore, the specific configurations of the respective constituent elements are not limited to those described in the above embodiment and can be variously changed or modified within the scope of the present invention.

An end user can set the growing environment data reflecting his or her own way and grow his or her plant in the plant growing facility at his or her desired time from the place remote from the plant growing facility, and can save time and labor for going to the plant growing facility to tend the plant. In this manner, it is possible to provide the excellent plant growing environment control terminal that enables the end consumer to grow plants by his or her own way while confirming a process of growth using images, that can effectively produce a so-called healing effect, and that can produce an effective educational effect related to growth of the plants.

What is claimed is:

1. A plant growing environment control terminal comprising:
   an image receiving section receiving image data from a plant growing facility, the plant growing facility configured to control a growing environment of a plant based on growing environment data for setting or changing the growing environment, and configure to pick up an image of the plant being grown in the growing environment, the growing environment including an irradiation light, a temperature, and a humidity;
   an image display section displaying the image of the plant based on the image data received by the image data receiving section;
   a growing environment data receiving section receiving the growing environment data;
   a growing environment data transmitting section transmitting the growing environment data received by the growing environment data receiving section to the plant growing facility;
   a proficiency degree management section for storing a proficiency degree of a user related to growing of the plant,
   wherein the higher the proficiency degree of the user is, the more growing environment data the growing environment data receiving section receives that can be manipulated by the user, and
   wherein the lower the proficiency degree, the more growing environment data, of the growing environmental data received by the growing environment data transmitting section, is prevented from being changed by the user.

2. The plant growing environment control terminal according to claim 1,
   wherein the plant growing environment control terminal is a portable telephone including at least data transmission and reception functions and an image display function.

3. The plant growing environment control terminal according to claim 1,
   wherein the image data receiving section can be set to receive the image data automatically and regularly.

4. The plant growing environment control terminal according to claim 1, further comprising:
   a transmission-reception status monitoring section monitoring at least one of a reception status of the image data and a transmission status of the growing environment data; and
   a notification section notifying that there is a problem with the transmission status or the reception status if the transmission-reception status monitoring section judges that there is the problem with the transmission status or the reception status.

5. The plant growing environment control terminal according to claim 1, further comprising a terminal-side passing time judging section judging whether predetermined time passes since seeding or budding when a setting change command to set or change the growing environment of the plant is received,
   wherein if the terminal-side passing time judging section judges that the predetermined time does not pass since the seeding or the budding, the setting change command is made so that the setting change command cannot be received.

6. The plant growing environment control terminal according to claim 1, further comprising a component analysis data receiving section receiving component analysis data on an analysis of components of the plant being grown or having been harvested from the plant growing facility.

7. The plant growing environment control terminal of claim 1 wherein the proficiency degree management section is configured to enable a user to select a proficiency degree and to correspondingly set operational parameters corresponding to the entered proficiency degree for that user during the growth of a plant in a user's terminal.

8. A remote plant growing system comprising:
a plant growing facility configured to control a growing environment of a plant based on growing environment data for setting or changing the growing environment, the growing environment including an irradiation light, a temperature, and a humidity; and
a plant growing environment control terminal bidirectionally communicable with the plant growing facility,
wherein the plant growing facility includes
an imaging section picking up an image of the plant being grown;
an image data transmitting section transmitting image data on the image picked up by the imaging section to the plant growing environment control terminal;
a growing environment data receiving section receiving the growing environment data transmitted from the plant growing environment control terminal to correspond to the image data transmitted by the image data transmitting section; and
a growing environment control section controlling the growing environment of the plant corresponding to the image data according to one of the growing environment data received by the growing environment data receiving section and default growing environment data, and
wherein the plant growing environment control terminal includes
an image receiving section receiving the image data from the plant growing facility;
an image display section displaying the image of the plant based on the image data received by the image data receiving section;
a growing environment data receiving section receiving the growing environment data;
a growing environment data transmitting section transmitting the growing environment data received by the growing environment data receiving section to the plant growing facility;
a proficiency degree management section for storing a proficiency degree of a user related to growing of the plant;
wherein the higher the proficiency degree of the user is, the more growing environment data the growing environment data receiving section receives that can be manipulated by the user and
wherein the lower the proficiency degree, the more growing environment data, of the growing environmental data received by the growing environment data transmitting section, is prevented from being changed by the user.

9. The remote plant growing system according to claim 8, wherein the image data transmitting section can be set to transmit the image data automatically and regularly.

10. The remote plant growing system according to claim 8, wherein the plant growing facility is used by and shared among a plurality of users so as to grow plants, respectively, and at least the growing environment control section out of the imaging section, the image data transmitting section, the growing environment data receiving section, and the growing environment control section is provided for each of the plurality of users.

11. The remote plant growing system according to claim 8, wherein the growing environment control section controls at least one of a light illuminating apparatus for controlling the irradiation light, a temperature controller for controlling the temperature, a mist spray device for controlling the humidity, a $CO_2$ supply device for controlling a $CO_2$ concentration, and a fertilizer supply device supplying a fertilizer.

12. The remote plant growing system according to claim 8, further comprising:
a growing environment measuring section measuring the growing environment under control of the growing environment control section; and
a growing environment measurement data transmitting section transmitting growing environment measurement data measured by the growing environment measuring section to the terminal.

13. The remote plant growing system according to claim 8, wherein the growing environment measuring section includes at least one of a light intensity sensor, a temperature sensor, a humidity sensor, a $CO_2$ concentration sensor, and a fertilizer analysis sensor.

14. The remote plant growing system according to claim 8, further comprising:
a receiving parameter storage section storing receiving parameters for promoting the terminal to receive the growing environment data; and
a receiving parameter transmitting section transmitting the receiving parameters stored in the receiving parameter storage section to the terminal.

15. The remote plant growing system according to claim 8, further comprising a facility time elapse judging section judging whether predetermined time passes since seeding or budding when a setting change command to set or change the growing environment of the plant is received,
wherein if the facility time elapse judging section judges that the predetermined time does not pass since the seeding or the budding, the setting change command is made so that the setting change command cannot be received.

16. The remote plant growing system according to claim 8, further comprising a component analysis data transmitting section transmitting component analysis data on the plant being grown or having been harvested to the terminal.

17. The plant growing environment control terminal according to claim 1, wherein the image display section is configured to display harvest age information indicating a number of days necessary from seeding to harvest based on a breed of the plant.

18. The remote plant growing system according to claim 8, wherein the growing environment control section controls at least one of a fog generation device generating fog, or a wind generation device producing wind.

19. The remote plant growing system of claim 8, wherein an image of the plant is transmitted to the user at the same time that component analysis data is transmitted to the user and the proficiency degree management section limits the growing environment data that can be altered by the user to enable the user to choose what variables in the growing environment data the user can transmit to the plant growing facility.

20. A plant growing environment control program embodied on a non-transitory computer readable medium for a terminal for causing a computer to function as:
an image receiving section receiving image data from a plant growing facility, the plant growing facility configured to control a growing environment of a plant based on growing environment data for setting or changing the growing environment, and configure to pick up an image of the plant being grown in the growing environment, the growing environment including an irradiation light, a temperature, and a humidity;

an image display section displaying the image of the plant based on the image data received by the image data receiving section;

a growing environment data receiving section receiving the growing environment data;

a growing environment data transmitting section transmitting the growing environment data received by the growing environment data receiving section to the plant growing facility; and a proficiency degree management section confirming a proficiency degree of a user related to growing of the plant;

wherein the higher the proficiency degree of the user is, the more growing environment data the growing environment data receiving section receives so as to be manipulatable by the user, and wherein the lower the proficiency degree, the more growing environment data, of the growing environmental data received by the growing environment data transmitting section, is prevented from being changed by the user.

* * * * *